(12) United States Patent
Uemura et al.

(10) Patent No.: US 6,641,647 B2
(45) Date of Patent: Nov. 4, 2003

(54) HYDROGEN-PERMEABLE STRUCTURE AND METHOD OF MANUFACTURING THE SAME

(75) Inventors: Takashi Uemura, Itami (JP); Kentaro Yoshida, Itami (JP); Nobuyuki Okuda, Itami (JP); Takeshi Hikata, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/182,516

(22) PCT Filed: Dec. 4, 2001

(86) PCT No.: PCT/JP01/10596
§ 371 (c)(1),
(2), (4) Date: Jul. 30, 2002

(87) PCT Pub. No.: WO02/45832
PCT Pub. Date: Jun. 13, 2002

(65) Prior Publication Data
US 2003/0000387 A1 Jan. 2, 2003

(30) Foreign Application Priority Data
Dec. 5, 2000 (JP) ......................... 2000-369724

(51) Int. Cl.$^7$ .................. B01D 53/22; B01D 69/12; B01D 71/02
(52) U.S. Cl. .................. 96/11; 95/56; 55/524; 55/DIG. 5
(58) Field of Search .................. 95/56; 96/4.11; 55/524, DIG. 5

(56) References Cited

U.S. PATENT DOCUMENTS

| | | | | |
|---|---|---|---|---|
| 3,155,467 A | * | 11/1964 | Yamamoto et al. | ............ 95/56 |
| 3,365,276 A | * | 1/1968 | Childs et al. | ............ 423/658.2 |
| 3,413,777 A | * | 12/1968 | Langley et al. | ............ 96/1 |
| 3,428,476 A | * | 2/1969 | Langley et al. | ............ 427/229 |
| 5,181,941 A | * | 1/1993 | Najjar et al. | ............ 95/50 1 |
| 5,205,841 A | * | 4/1993 | Vaiman | ............ 95/46 |
| 5,215,729 A | * | 6/1993 | Buxbaum | ............ 423/248 |
| 5,217,506 A | * | 6/1993 | Edlund et al. | ............ 95/56 |
| 5,259,870 A | * | 11/1993 | Edlund | ............ 95/56 |
| 5,358,553 A | * | 10/1994 | Najjar et al. | ............ 96/11 |
| 5,393,325 A | * | 2/1995 | Edlund | ............ 95/56 |
| 5,498,278 A | * | 3/1996 | Edlund | ............ 96/11 |
| 5,645,626 A | * | 7/1997 | Edlund et al. | ............ 95/56 |
| 5,782,960 A | * | 7/1998 | Ogawa et al. | ............ 96/11 |
| 5,931,987 A | * | 8/1999 | Buxbaum | ............ 95/55 |
| 5,955,044 A | * | 9/1999 | Lucht et al. | ............ 423/230 |
| 5,980,989 A | * | 11/1999 | Takahashi et al. | ............ 427/294 |
| 5,989,319 A | * | 11/1999 | Kawae et al. | ............ 96/11 |
| 6,066,592 A | * | 5/2000 | Kawae et al. | ............ 502/439 |
| 6,214,090 B1 | * | 4/2001 | Dye et al. | ............ 95/56 |
| 6,238,465 B1 | * | 5/2001 | Juda et al. | ............ 96/11 |
| 6,267,801 B1 | * | 7/2001 | Baake et al. | ............ 95/56 |
| 6,319,306 B1 | * | 11/2001 | Edlund et al. | ............ 96/7 |
| 6,350,297 B1 | * | 2/2002 | Doyle et al. | ............ 95/55 |
| 6,419,726 B1 | * | 7/2002 | Frost et al. | ............ 95/56 |
| 6,458,189 B1 | * | 10/2002 | Edlund et al. | ............ 96/7 |

FOREIGN PATENT DOCUMENTS

| | | |
|---|---|---|
| JP | 04349926 | 12/1992 |
| JP | 10028850 | 2/1998 |
| JP | 11057433 | 3/1999 |
| JP | 11267477 | 10/1999 |
| JP | 11286785 | 10/1999 |
| JP | 2000005580 | 1/2000 |
| JP | 2000247605 | 9/2000 |

* cited by examiner

*Primary Examiner*—Robert H. Spitzer
(74) *Attorney, Agent, or Firm*—W. F. Fasse; W. G. Fasse

(57) ABSTRACT

A hydrogen permeable structure includes a base material (1) including porous ceramic, and a hydrogen permeable film (2) formed on the base material (1), including palladium (Pd) and at least one element other than palladium and having an amount of hydrogen dissolution at a prescribed temperature smaller than that of palladium alone. The hydrogen permeable film (2) is formed on the surface of the porous ceramic base by a physical vapor deposition technique after any pin holes in the surface of the base have been filled with a porous oxide material.

9 Claims, 1 Drawing Sheet

HYDROGEN-PERMEABLE STRUCTURE AND METHOD OF MANUFACTURING THE SAME

FIELD OF THE INVENTION

The present invention generally relates to a hydrogen permeable structure and a method of manufacturing the same, and more particularly, to a hydrogen permeable structure in which a hydrogen permeable film is formed on a porous base material and a method of manufacturing the same.

BACKGROUND INFORMATION

Hydrogen gas is used as a fuel for a fuel cell and the like, and is manufactured e.g. by a method of transforming gaseous fuel. For instance, according to the method of transforming gaseous fuel, water vapor is reformed to produce hydrogen gas, the reformed gas including, in addition to hydrogen as a principal component, carbon monoxide, carbon dioxide and the like as sub components. If the reformed gas is used as it is for a fuel cell, the cell performance deteriorates. Thus, there is a need for removing sub components, i.e. components other than hydrogen, to refine the reformed gas in order to obtain a high purity hydrogen gas. One refining method utilizes a characteristic of a hydrogen permeable film that selectively allows only hydrogen to pass through the film. For use, the hydrogen permeable film is formed on a porous support or base material.

For instance, Japanese Patent Laying-Open No. 11-267477 has proposed a hydrogen permeable structure in which a hydrogen permeable film such as a Pd film, Nb film or the like having a thickness of approximately 0.1 to 20 $\mu$m is formed by an ion plating technique on the surface of a porous support made of stainless steel or ceramic such as alumina and silicon nitride.

Moreover, Japanese Patent Laying-Open No. 11-286785 has proposed a hydrogen permeable structure in which Pd metal and metal to be alloyed with Pd are alternately layered on the surface of a porous support by an electroless plating technique or the ion plating technique, which is subsequently subjected to a heating process, to form a Pd alloy film as a hydrogen permeable film.

Furthermore, Japanese Patent Laying-Open No. 4-349926 has proposed a hydrogen gas separation film in which silica gel having an average pore diameter of 10 to 30 Å, alumina gel having an average pore diameter of 15 to 30 Å or silica-alumina gel having an average pore diameter of 10 to 20 Å is formed in pores of an inorganic porous body having pore diameters in the range between 10 and 10000 Å, and a thin film containing palladium is formed on the surface thereof as a hydrogen permeable film.

Japanese Patent Laying-Open No. 10-28850 has proposed a hydrogen separation structure including a base material made of porous ceramic or porous glass, a first layer layered on the base material, and a second layer layered on the first layer and made of Pd or a Pd alloy as a hydrogen permeable film, the first layer being formed of a material having a thermal expansion coefficient within the range between that of the base material and that of the second layer. The first layer relieves stress applied between the base material and the second layer when the hydrogen separation structure is exposed to an atmosphere with large temperature variation, to prevent the second layer from peeling off from the base material.

Japanese Patent Laying-Open No. 11-267477, Japanese Patent Laying-Open No. 11-286785, or Japanese Patent Laying-Open No. 4-349926 discloses a structure in which a hydrogen permeable film is formed on the surface of a porous support, which has suffered from peeling of the hydrogen permeable film when the hydrogen permeable structure is used in the atmosphere of various conditions, presenting a problem in durability.

To prevent the hydrogen permeable film from peeling off, the hydrogen separation structure disclosed in Japanese Patent Laying-Open No. 10-28850 has employed a layer, formed of a material having a thermal expansion coefficient within the range between that of a porous base material and that of a hydrogen permeable film, interposed between the porous base material and the hydrogen permeable film.

By merely relieving the difference in the thermal expansion coefficients between the porous base material and the hydrogen permeable film, however, it was difficult to effectively prevent peeling of the hydrogen permeable film.

SUMMARY OF THE INVENTION

An object of the present invention is, therefore, to provide a hydrogen permeable structure that can more effectively prevent peeling of a hydrogen permeable film and thereby having increased durability, and a method of manufacturing the same.

The present inventors have examined various possible causes of peeling of a hydrogen permeable film, and found that the primary cause of the peeling is the compressive stress occurring due to lattice expansions of metallic crystals associated with hydrogen dissolution, rather than the difference in thermal expansion coefficients between a porous base material and the hydrogen permeable film, and that such peeling can be prevented by forming a hydrogen permeable film with a small amount of hydrogen dissolution.

Based on such findings, the above object has been achieved according to the invention in a hydrogen permeable structure comprising a base made of a material including a porous ceramic, said base having a base surface with at least one pin hole in said base surface, a porous oxide material filling said at least one pin hole thereby making said base surface plane, a hydrogen permeable film including palladium and at least one element other than palladium on said plane base surface, said hydrogen permeable film having, at a prescribed temperature, an amount of hydrogen dissolution, which is smaller than an amount of hydrogen dissolution in palladium alone at said prescribed temperature.

The above defined hydrogen permeable structure is manufactured according to the invention by the following steps:

a) producing a base of a material including a porous ceramic material, said base having a base surface with at least one hole in said base surface, b) filling said at least one hole in said base surface with a porous oxide material to thereby make said base surface plane, c) forming on said plane base surface a hydrogen permeable film made of a film material including palladium and at least one element other than palladium, said film material having at a prescribed temperature, an amount of hydrogen dissolution that is smaller than an amount of hydrogen dissolution in palladium alone at said prescribed temperature. Preferably the forming step is performed by vapor deposition.

A modified embodiment of the present hydrogen permeable structure is manufactured by the following steps:

a) producing a base of a material including porous ceramic material having a base surface, b) vapor depositing on said base surface a hydrogen permeable film made of a film material including palladium and at least one element other than palladium, said film material having, at a prescribed temperature, an amount of hydrogen dissolution that is smaller than an amount of hydrogen dissolution in palladium alone at said prescribed temperature, and c) performing said step b) in a vacuum atmosphere of 13.3 Pa at the most, and by applying a potential difference of at least 400 V between said base and a raw material which provides said film material.

The amount of hydrogen dissolution in % by weight is defined as a value measured according to the method described in the EXPERIMENTAL section of "Solubility of Hydrogen in Palladium-Silver Alloys" in Russian Journal of Physical Chemistry 47(1) published in 1973, and is based on a value measured using a bulk sample with the same composition as the hydrogen permeable film.

According to the present invention the hydrogen permeable film has, at a prescribed temperature, a hydrogen dissolution amount that is, smaller than the hydrogen dissolution amount of palladium alone at the same temperature. Compared with a conventional hydrogen permeable metal film of palladium alone, in the working temperature range including a prescribed temperature, the invention reduces the hydrogen dissolution amount of the hydrogen permeable film thereby reducing the expansion of the crystal lattice of the palladium metal and of the film, whereby film peeling is suppressed. The compression stress imposed on the film by its expansion is reduced, whereby the stress applied at the interface between the film and the base is reduced. This feature significantly reduces the physical deterioration of the hydrogen permeable film particularly peeling, cracking and the like, are reduced and the durability of the hydrogen permeable structure is improved.

Preferably, the prescribed temperature in the hydrogen permeable structure, is at least 200° C. and at most 700° C.

More preferably, in the hydrogen permeable structure of the present invention, the at least one element other than palladium that is included in the hydrogen permeable film is platinum (Pt).

More preferably, in the hydrogen permeable structure of the present invention, the hydrogen permeable film includes palladium and platinum, the content of the platinum being at least 5% by mass and at most 15% by mass. Increasing the content of platinum can further reduce the amount of hydrogen dissolution into the film, though it lowers the permeability or permeation speed of hydrogen gas through the film. In order to improve the hydrogen gas permeability to a degree higher than that of the hydrogen permeable structure made of palladium alone and to enhance the durability of the hydrogen permeable structure by reducing the amount of hydrogen dissolution into the film, it is suggested that the content of platinum in the hydrogen permeable film, including palladium and platinum, is preferably set within the range between 5 to 15% by mass.

In the hydrogen permeable structure of the present invention, the porous ceramic forming the base is preferably silicon nitride ($Si_3N_4$). Among various types of ceramic, silicon nitride is superior in strength, fracture toughness, abrasion resistance, chemical resistance and heat resistance, whereby a further enhancement of the durability of the hydrogen permeable structure of the present invention is achieved.

The porous base material including porous ceramic material has at least one hole in the surface, and a porous oxide material or layer is preferably applied to fill the hole. Thus, the surface of the base material is made plane while the hole at the surface is filled with the porous oxide layer, allowing the hydrogen permeable film to be formed on the surface of the base material in a closely packed manner without pin holes, whereby the permeability of the hydrogen permeable film is improved. Moreover, the adhesion between the surface of the base and the hydrogen permeable film is enhanced, thereby further improving the durability of the hydrogen permeable structure. The porous oxide layer or material preferably includes at least one material selected from the group consisting of aluminum oxide ($Al_2O_3$), silicon dioxide ($SiO_2$) and zirconium oxide ($ZrO_2$). The most preferred porous oxide material is aluminum oxide.

As described above, according to the present invention, peeling of a hydrogen permeable film and physical deterioration such as peeling and cracks have been significantly reduced, whereby the durability of the hydrogen permeable structure has been improved.

DETAILED DESCRIPTION OF PREFERRED EXAMPLE EMBODIMENTS

AND THE BEST MODES FOR CARRYING OUT THE INVENTION

Figure 1:
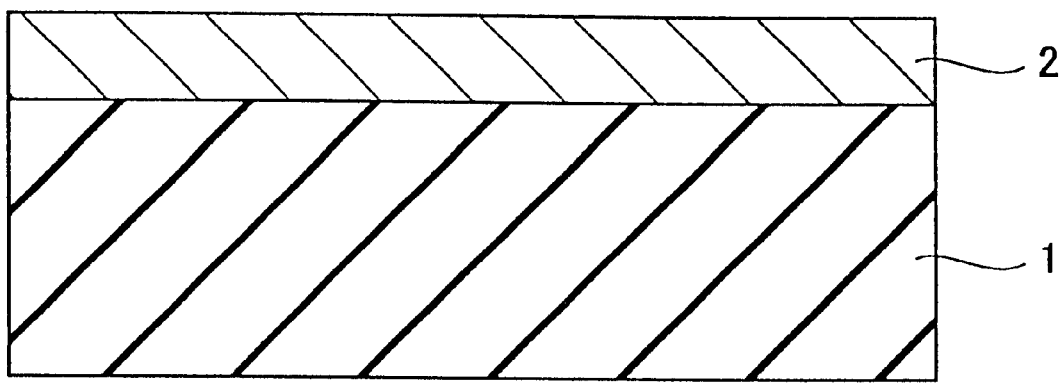
FIG. 1 which is the only FIGURE shows a schematic cross section of a hydrogen gas separation structure as an embodiment of the present invention.

As shown in FIG. 1, according to an embodiment of the present invention a hydrogen permeable structure is produced by forming an alloy film 2 containing palladium and an element other than palladium on a porous ceramic base 1. The alloy film 2 functions as a hydrogen permeable film. The alloy film has an amount of hydrogen dissolution at e.g. 400° C. which is smaller than the hydrogen dissolution of a metal film formed of palladium alone.

Hydrogen dissolution into palladium metal causes the crystal lattice of the palladium metal to expand. The volume of the palladium metal is increased by $2.8 \times 10^{-30}$ m$^3$ when one hydrogen atom exists in the crystal lattice of the palladium metal. This increased value and the amount of hydrogen dissolution into the palladium metal film cause an expansion of the palladium metal film, which expansion is much larger than the thermal expansion of the palladium metal film itself when the hydrogen gas separation structure is used at e.g. 400° C. Therefore, the reduction of the hydrogen dissolution into the film rather than the reduction of the thermal expansion of the film itself, lowers the stress effective in the interface between the base and the film. As a result, the physical deterioration, such as film peeling and cracks, is efficiently reduced whereby the durability of the hydrogen gas separation structure is substantially improved compared to conventional structures with only palladium in the hydrogen permeable film.

The hydrogen permeable film may include as a component any elements other than palladium that has an amount of hydrogen dissolution at a prescribed working temperature smaller than that of a film formed of palladium metal alone. An embodiment of the invention forms the hydrogen permeable film by adding platinum to palladium. For example, at the temperature of 400° C., the amount of hydrogen dissolution per 100 g of palladium metal is approximately 15 mg for the palladium metal alone, whereas, for a palladium-platinum-based alloy comprised of 90% by mass of palladium and 10% by mass of platinum, the amount of hydrogen dissolution per 100 g of the alloy is approximately 8 mg, which is lower than the 15 mg mentioned above. Moreover, as for the hydrogen gas permeability, the amount of hydrogen gas permeation is 2.3 cm$^3$/cm$^2$/min·cm for the palladium metal alone, whereas it is 2.8 cm$^3$/cm$^2$/min·cm for the palladium-platinum-based alloy comprised of 90% by mass of palladium and 10% by mass of platinum, showing improvement in the hydrogen gas permeability. It is noted that the measurement is performed under the condition that the temperature is 500° C., the hydrogen pressure on the supplying side is 303.975 kPa (3 atmospheric pressure) and the hydrogen pressure on the permeation side is 0 kPa (0 atmospheric pressure).

The hydrogen permeable film may be formed of a single-layer film of an alloy including palladium and an element other than palladium, or may have a multi-layered film structure constituted by a plurality of layers of the above alloy.

Considering that the hydrogen permeability of the hydrogen permeable film is inversely proportional to the thickness of the film, the thickness of the hydrogen film is preferably at most 10 $\mu$m, and more preferably at most 1 $\mu$m.

Moreover, it is preferable to form the hydrogen permeable film on the surface of a porous ceramic base material that has been made plane in such a manner that holes at the surface are filled with aluminum oxide, silicon dioxide, zirconium oxide or the like, to reduce pin holes in the film surface. More preferably, a porous aluminum oxide layer is formed at a hole portion on the surface of the base to make that surface plane. The surface of the hole portion that has the area ratio of 30–70% is covered by the porous aluminum oxide layer, while ceramic particles are exposed at the surface of other base portions. The hydrogen permeable film formed on the surface of such a base material and the base material adhere strongly to each other. Such adhesion prevents the hydrogen permeable film from peeling off from the base material when the hydrogen-containing gas is purified, which allows a close structure without pin holes, whereby the amount of gas other than hydrogen passing through the hydrogen permeable film is substantially reduced. Therefore, hydrogen gas with a high purity can be obtained.

Though the hydrogen permeable film may be formed by any film-forming method, a method of physically depositing a film with a vacuum of at most 13.3 Pa (0.1 Torr), such as an ion plating technique and a spattering technique, is preferably used to form the film. Here, a potential difference of at least 400V is preferably applied between the base material (or a base material holder) and a raw material for vapor deposition (a target). The application of such a potential difference increases energy used when the raw material for vapor deposition adheres to the base material, improving adhesion of the film to the base material.

Though there are various types of ion plating techniques and any type thereof may be applied to the present invention, in particular, an arc ion plating technique (arc discharge ion plating technique) is preferably used.

A film including palladium, for example, has an excellent hydrogen permeability as a hydrogen permeable film. The hydrogen permeability on the (100) plane of the palladium crystal is, however, lower than that of the other crystal planes. Accordingly, a film including palladium is formed such that the palladium crystals are oriented in their (111) planes in order to obtain hydrogen permeability better than that of the film without such orientation. According to the manufacturing method of the present invention, in a film including palladium that is formed by applying a potential difference between the base material and the raw material for vapor deposition, the palladium crystals are oriented in their (111) planes, so that good hydrogen permeability can be obtained.

For the porous ceramic used as a base material of the hydrogen permeable structure in the present invention, different types of oxides such as aluminum oxide or various types of nitrides such as silicon nitride may be applied, silicon nitride being the most preferable in terms of strength and the like. The silicon nitride preferably includes therein a net-like cavity portion where columnar $\beta$-Si$_3$N$_4$ crystal particles are intertangled. Moreover, the porosity of the porous silicon nitride base material is preferably in the range between 30 and 70%, more preferably in the range between 40 and 50%. Furthermore, the flexural strength of the porous silicon nitride base material is preferably in the range between 30 to 450 Mpa, and more preferably in the range between 200 and 450 Mpa.

EXAMPLE 1

A porous silicon nitride sintered body with the average pore diameter of 0.3 $\mu$m was prepared as a base material of a hydrogen permeable structure. Particles of alumunum oxide with the average particle diameter of 0.03 $\mu$m dispersed in water were applied on the surface of the base material and fired at a temperature of 750° C. for one hour. Thus, a hole at the surface of the base material was filled with a porous aluminum oxide layer to make the surface of the base material plane and to avoid pin holes.

An arc ion plating device was used as a device for forming a hydrogen permeable film on the surface of the porous silicon nitride base material processed as described above. An alloy having a composition comprised of 90% by mass of palladium and 10% by mass of platinum, i.e. a raw material for the hydrogen permeable film, was set as a target within a chamber in the arc ion plating device, the base material and the target being spaced by the distance of 300 mm. The pressure in the chamber in the arc ion plating device was set to 2.66×10$^{-3}$ Pa (2×10$^{-5}$ Torr) and then the bias voltage and arc current were set at −1000V and 80 A, respectively, in order to provide a potential difference between the base material and the target, and the device was operated for 10 minutes. Thus, a palladium-platinum alloy film having a thickness of 0.3 $\mu$m was formed on the surface of the base material.

For the hydrogen permeable structure manufactured as described above, a heat cycle test was performed for 100 cycles at a temperature between 400° C. and room temperature in a hydrogen gas atmosphere of 101.325 kPa (1 atmospheric pressure). Subsequent to this test, the film was examined for peeling by visual observation and for cracks by electron microscopic observation, which showed that no physical deterioration of the film such as peeling or cracks was observed. It is noted that the amount of hydrogen dissolution per 100 g of an alloy having a composition comprised of 90% by mass of palladium and 10% by mass of platinum was, when measured by the method described earlier, 8 mg. Moreover, when 202.65 kPa (2 atmospheric pressure) of hydrogen gas was supplied while the hydrogen gas on the permeation side was set as 101.325 kPa (1 atmospheric pressure), the amount of hydrogen gas permeation was 100 cm$^3$/cm$^2$/min at the temperature of 350° C.

Further, when the hydrogen permeable structure was used to purify hydrogen-containing gas at the temperature of 400° C., the palladium-platinum alloy film showed good hydrogen gas permeability without peeling off from the base material, allowing hydrogen gas with high purity to be obtained.

COMPARATIVE EXAMPLE 1

A hydrogen permeable structure was manufactured as in Example 1, except that metal of palladium alone for a raw material of a hydrogen permeable film was set as a target within the chamber in the arc ion plating device. The obtained hydrogen permeable structure was subjected to a heat cycle test under a condition similar to that in Example 1. After ten cycles, the film was examined for peeling by visual observation and for cracks by electron microscopic observation, which showed that partial peeling of the film was observed by visual observation while cracks were observed on the film by the electron microscopic observation. It is noted that, for the metal of palladium alone, the amount of hydrogen dissolution per 100 g of metal was 15 mg. The amount of hydrogen gas permeation was, when measured under the condition similar to that in Example 1, 50 $cm^3/cm^2/min$.

COMPARATIVE EXAMPLE 2

A hydrogen permeable structure was manufactured as in Example 1, except that an alloy having a composition comprised of 75% by mass of palladium and 25% by mass of silver for a raw material of a hydrogen permeable film was set as a target within the chamber in the arc ion plating device. The obtained hydrogen permeable structure was subjected to a heat cycle test under a condition similar to that in Example 1. The result revealed that the film was entirely peeled after one cycle of the heat cycle test and completely off the base material. It is noted that the amount of hydrogen dissolution was 75 mg per 100 g of the alloy having a composition comprised of 75% by mass of palladium and 25% by mass of silver. Because of the peeling, this sample could not be measured for the amount of hydrogen gas permeation.

COMPARATIVE EXAMPLE 3

A hydrogen permeable structure was manufactured as in Example 1, except that metal of palladium alone for a raw material of a hydrogen permeable film was set as a target within the chamber in the arc ion plating device. The obtained hydrogen permeable structure was subjected to a heat cycle test for 100 cycles in atmospheric air of 101.325 kPa (1 atmospheric pressure) at a temperature between 400° C. and the room temperature. Subsequent to the test, the film was examined for peeling by visual observation and for cracks by electron microscopic observation, which showed that no physical deterioration of the film such as peeling or cracks was observed.

As described above, comparison between Example 1 and Comparative Examples 1 and 2 shows that there is a clear relevance between the amount of hydrogen dissolution into the hydrogen permeable film and durability of the hydrogen permeable structure, and that the hydrogen permeable structure in Example 1 according to the present invention is superior in durability. Moreover, in Comparative Example 3, a heat cycle test was performed in the atmospheric air for the hydrogen permeable structure having a hydrogen permeable film of palladium metal alone, the result of which shows that heat expansion of the film has a small effect on durability of the hydrogen permeable structure, and that it is the expansion of the film due to hydrogen dissolution into the film in hydrogen gas atmosphere that mainly lowers durability.

The hydrogen permeable structure according to the present invention is suitable for obtaining hydrogen gas with high purity which can be used as fuel in a fuel cell and the like.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A hydrogen permeable structure comprising a base made of a material including a porous ceramic, said base having a base surface with at least one pin hole in said base surface, a porous oxide material filling said at least one pin hole thereby making said base surface plane, a hydrogen permeable film including palladium and at least one element other than palladium on said plane base surface, said hydrogen permeable film having, at a prescribed temperature, an amount of hydrogen dissolution which is smaller than an amount of hydrogen dissolution in palladium alone at said prescribed temperature.

2. The hydrogen permeable structure of claim 1, wherein said prescribed temperature is within the range of at least 200° C. to 700° C. at the most.

3. The hydrogen permeable structure of claim 1, wherein said at least one element other than palladium is platinum.

4. The hydrogen permeable structure of claim 3, wherein said platinum in said hydrogen permeable film is within the range of at least 5% by mass to 15% by mass at the most.

5. The hydrogen permeable structure of claim 1, wherein said porous ceramic of said base is silicon nitride.

6. The hydrogen permeable structure of claim 1, wherein said porous oxide material filling said at least one hole comprises at least one porous oxide material selected from the group consisting of aluminum oxide, silicon oxide and zirconium oxide.

7. A method for manufacturing a hydrogen permeable structure, said method comprising the following steps:

a) producing a base of a material including porous ceramic material, said base having a base surface with at least one hole in said base surface, b) filling said at least one hole in said base surface with a porous oxide material to thereby make said base a surface plane, and c) forming on said plane base surface a hydrogen permeable film made of a film material including palladium and at least one element other than palladium, said film material having, at a prescribed temperature, an amount of hydrogen dissolution that is smaller than an amount of hydrogen dissolution in palladium alone at said prescribed temperature.

8. The method of claim 7, comprising performing said step of forming said hydrogen permeable film by a physical vapor deposition technique.

9. A method for manufacturing a hydrogen permeable structure, said method comprising the following steps:

a) producing a base of a material including porous ceramic material having a base surface, b) vapor depositing on said base surface a hydrogen permeable film made of a film material including palladium and at least one element other than palladium, said film material having, at a prescribed temperature, an amount of hydrogen dissolution that is smaller than an amount of hydrogen dissolution in palladium alone at said prescribed temperature, and c) performing said step b) in a vacuum atmosphere of 13.3 Pa at the most and by applying a potential difference of at least 400 V between said base and a raw material which provides said film material.

* * * * *